(No Model.)
J. A. FILLMORE.
SPRING BALANCE SHADE.
No. 281,480. Patented July 17, 1883.
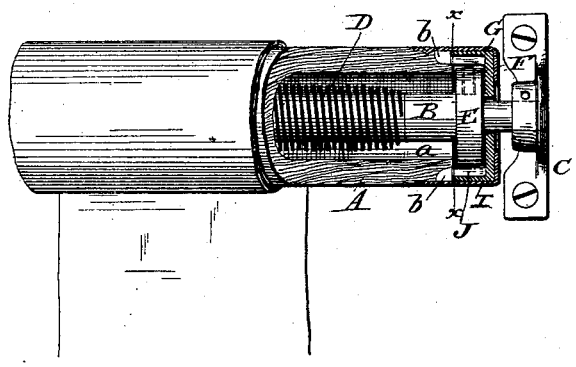
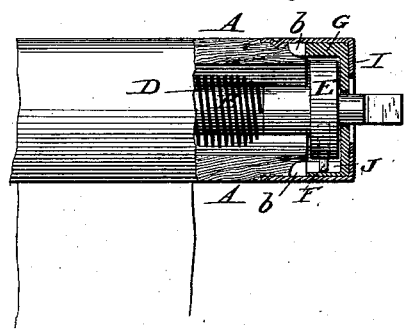
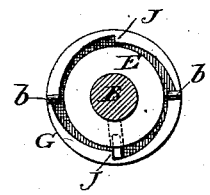
Attest.
Sidney P. Hollingsworth
Harry Shipley
Inventor.
J. A. Fillmore
By his Attorney
Philip T. Dodge

UNITED STATES PATENT OFFICE.

JAMES A. FILLMORE, OF MINNEAPOLIS, MINNESOTA.

SPRING-BALANCE SHADE.

SPECIFICATION forming part of Letters Patent No. 281,480, dated July 17, 1883.

Application filed October 23, 1882. (No model.)

*To all whom it may concern:*

Be it known that I, JAMES A. FILLMORE, of Minneapolis, in the county of Hennepin and State of Minnesota, have invented certain new and useful Improvements in Spring Curtain-Rolls, of which the following is a specification.

This invention relates to that class of rolls wherein a coiled spring mounted therein and connected with a spindle or journal is employed to counterbalance the weight of the roll, that it may remain suspended at any point at which it may be placed, or to turn the roll for the purpose of winding the curtain thereon.

The particular aim of my invention is to provide means whereby the tension of the spring may be maintained during the act of placing the roll in position, or upon removing the same from its supports; and to this end it consists, essentially, in providing the stationary spindle or journal with a pin or dog arranged to engage with a corresponding device attached directly to and carried with the roll whenever the spindle is turned upside down, the arrangement of the parts being such that when the spindle is in its operative position its pin or dog remains out of action, permitting the free rotation of the roll, but that whenever the spindle is removed from its place and inverted its dog instantly engages the roll.

My device may be varied in construction to a limited extent; but I prefer to retain the details of construction herein described.

Referring to the accompanying drawings, Figure 1 represents a longitudinal central section of my improved device, the parts being in their normal operative positions. Fig. 2 is a sectional view with the roll removed from its support and the dog in engagement to hold the spring under tension. Fig. 3 is a cross-section on the line *x x* of Fig. 1.

Referring to the drawings, A represents the cylindrical body of the roll constructed in the ordinary manner with a central opening, *a*, at one end to receive one end of the stationary shaft or spindle B, the outer end of which latter is seated firmly in a recess in a bracket or other support, C, for the purpose of sustaining the roll. Within the roll the spindle B is encircled by a spiral spring, D, one end of which is suitably connected thereto, while the opposite end is connected to the body of the roll, so that when under tension the spring, by reason of its connection with the stationary spindle, tends to revolve the roll, and thus wind or counterbalance the weight of the curtain.

The above parts are of substantially ordinary construction and are not claimed as of my invention.

In the employment of ordinary curtain-rolls containing the above features great annoyance is experienced on account of the difficulty of maintaining the tension of the spring during the adjustment of the roll in the brackets, and when the roll is removed from the brackets for the adjustment of the curtain or for other purposes. It is to avoid this difficulty and secure automatically the locking of the spring under tension when the roll is removed from the brackets, and the release of the locking devices when the roll is applied to the brackets, that my invention is intended. To attain this end I secure firmly upon the stationary spindle B a disk or wheel, E, having in its upper side a radial hole or opening containing a gravitating pin or dog, F. In the normal condition of the parts the hole stands at the upper side of the disk, and the pin, by reason of its gravity, remains seated in the bottom of the hole without projecting beyond the periphery of the disk, being in this condition inactive. To the end of the roll I secure firmly a disk or wheel, G, loosely encircling the stationary spindle, and provided with a peripheral flange or rim, which encircles the stationary disk E, and is provided on the inside with a series of ratchet-teeth, J, as shown in Fig. 3. This ratchet-wheel may be secured to the roll in any suitable manner which will cause it to revolve therewith; but it is preferred to provide it, as shown in the drawings, with spurs or teeth *b*, to enter the end of the roll and to secure it in place thereon by means of a cap or thimble, I, applied over the outside of the disk or roll and secured to the latter by indentations or other fastening devices.

In the ordinary condition the spindle, being held from rotation by means of the bracket with which it is rigidly engaged, maintains the opening at its upper side with the pin F in its inactive condition, as represented in Fig. 2; but upon the removal of the spindle from the bracket it is immediately caused, by the action of the spring, to revolve with respect to the roll, thereby turning the wheel E in such manner as to bring its opening at the under side, whereupon the pin F, acting under the influence of gravity, is caused to protrude beyond the wheel E, and engage with the teeth on the inside of the ring or wheel G. In this manner the spindle is prevented from rotating farther in respect to the roll and caused to maintain the spring under tension. On again placing the roll in position care is taken to insert the spindle into the bracket in such manner as to present the locking pin or dog at the upper side of the wheel E, the pin being held in its locked or extended position by the pressure of the ratchet-teeth thereon. After the parts are adjusted in position a slight pull upon the curtain, turning the roll, will relieve the pin from the pressure of the ratchet-teeth, whereupon the pin will descend within the wheel, leaving the roll free to turn in the ordinary manner. The pin having thus retreated will remain in its inoperative position until the roll is again removed from the bracket.

While the gravitation of the pin is in most cases relied upon as a means of causing the locking and unlocking action, it is found in practice that it will, because of its being located outside of or eccentric to the spindle, be thrown outward by the centrifugal force developed, so as to engage properly with the teeth when the roll, upon being removed from the bracket, is caused to assume an upright or inclined position.

The present invention is restricted to those matters and things which are hereinafter claimed, and as to all matters which may be described and shown, but which are not claimed, the right is reserved to make the same the subject of a separate patent.

It will be noted that my device is extremely simple in character, and that the locking dog or pin forms a direct connection between the non-rotating spindle and the toothed wheel attached directly to the roll.

Having thus described my invention, what I claim is—

1. The combination of the rotary roll having the toothed wheel J secured rigidly thereto, the spring, the non-rotating spindle, and the wheel E, secured to the spindle and provided in its upper side with the pin F, adapted and arranged to engage with the wheel E, as described.

2. The combination of the roll, the spring, the internally-toothed wheel having the spurs $b$ seated in the roll, the non-rotating spindle with its wheel E and pin F, and the cap I, applied as shown.

3. In combination with the rotating roll, the internally-toothed wheel or ring secured thereto and revolving therewith, the spring, the non-rotating spindle, and the gravitating dog applied eccentrically to said spindle.

Dated October 20, 1882.

JAMES A. FILLMORE.

In presence of—
R. R. ODELL,
A. R. CHESNUT.